Feb. 8, 1966  E. M. DE COURSEY  3,233,914
RESILIENT HANGER FOR SWINGING HALF AXLES
Filed Feb. 15, 1961  2 Sheets-Sheet 1
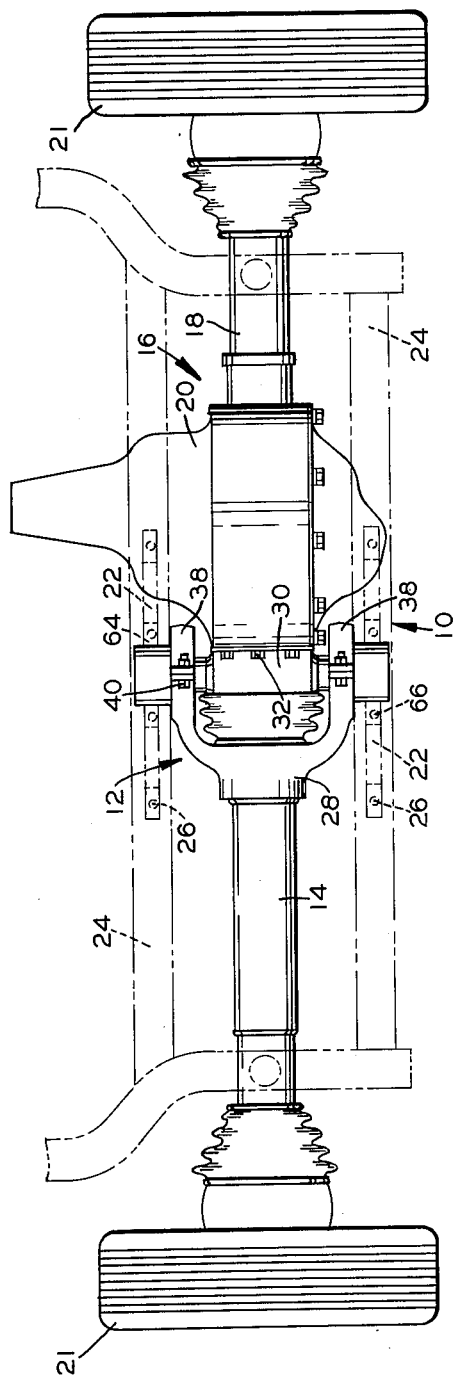
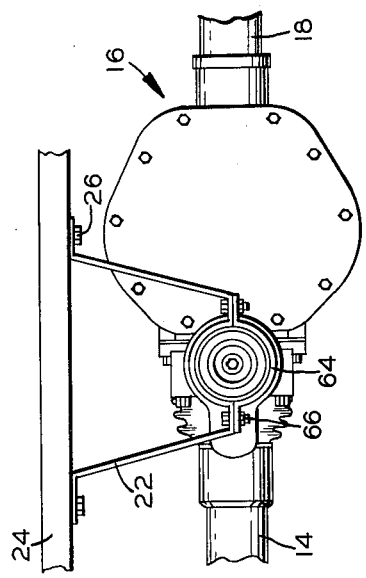
*INVENTOR.*
EVERSON M. DeCOURSEY
BY *Walter E. Pavlick*
ATTORNEY INVENTOR.
EVERSON M. DECOURSEY
BY Walter E. Pavlick
ATTORNEY

United States Patent Office 3,233,914
Patented Feb. 8, 1966

3,233,914
RESILIENT HANGER FOR SWINGING
HALF AXLES
Everson M. De Coursey, Auburn, Ind., assignor to Dana
Corporation, Toledo, Ohio, a corporation of Virginia
Filed Feb. 15, 1961, Ser. No. 89,387
6 Claims. (Cl. 280—124)

This invention relates to swing axle suspensions in general and is particularly directed to a hinge joint therefor which is secured to a vehicle frame.

While this invention is equally applicable to non-driving or dead axles, it is particularly adapted to the drive axle (usually the rear axle) and will be described in detail relative thereto.

Although there are many different types of swing axle systems or independent rear suspension systems as they are commonly called, it may be generalized that these systems feature (1) rear wheels that move vertically independently of each other, (2) a non-rigid rear axle that flexes somewhere near the middle and (3) a differential that is in some way connected to the vehicle frame.

Outwardly, the important difference between the swing axle or independent rear suspension system and the conventional system is that when an independent rear suspension vehicle hits a bump, the shock is largely absorbed by the spring on the side of the vehicle where the bump has occurred.

In contrast, when a conventional vehicle's wheels strike a bump, the shock is transmitted through the rigid axle to the other wheel and spring and, thence, to the whole rear end of the car resulting in the familiar jouncing of the vehicle.

With an independent rear suspension the vertical clearance or jouncing area for the rear axle and differential is substantially decreased and since the differential is substantially secured to the body, it is apparent that the tunnel for the drive shaft which normally oscillates with the differential can be reduced by several inches.

Another advantage of independent rear suspension is that the differential is secured to the frame, and the unsprung weight is reduced resulting almost automatically in improving the vehicle ride.

While the independent rear suspension has produced the foregoing advantages, it is not entirely free of problems. By far the most common type of independent rear suspension is the swing axle which continually causes the wheels of a moving vehicle to change their camber (their perpendicularity to the ground). An excessive degree of camber results in poor vehicle handling in addition to producing uneven vehicle tire wear. To remedy this, a swing axle, commonly referred to as the Diamler-Benz type, utilizes an axle split in the middle with the differential being a part of one-half axle. This permits longer half axles with a greater pivoting radius and hence reduces the amount of camber variation. Furthermore, this type of arrangement decreases the number of universal joints required in the power transmitting line.

Another problem which arises with independent rear suspension is that due to the attachment of the differential to the vehicle frame, a perfect channel is provided for the transmission of engine and differential noises to the passenger compartment.

Also, unless the differential and the half axles are properly mounted with respect to the frame, the differential will tend to rotate with the half axles and dip relative to the frame upon acceleration or deceleration of the vehicle or in response to the braking couple on the axle members.

It is an object of this invention to provide a swinging half axle which reduces the transmission of forces from the road wheels to the vehicle frame and body by the employment of resilient means linking the half axles to the vehicle frame or body.

It is another object of this invention to provide attaching means for a swinging half axle assembly wherein each member of the half axle is independently and resiliently mounted to the vehicle frame or body, yet resiliently stabilized against horizontal and rotative movement.

It is a further object of this invention to provide an axle hanger for attachment to a vehicle frame or body and independently and resiliently mount each member of the half axle to said hanger.

It is a still further object of this invention to provide a swing axle assembly wherein the hinge means suspending the half axles thereof acts as a resilient connection between the axle and the vehicle frame or body thereby damping the transmission of noise and forces therebetween.

Yet a still further object of this invention is to provide a hinge means suspending the half axles which will permit each half axle to swing without affecting the other half axle and which further will resist deformation or dipping of the axle assembly due to driving and braking torque.

Yet another object of this invention is to provide a hinge joint which may be used with "dead or live" swing axle assemblies.

It is yet a further object of this invention to provide a hinge joint for a swing axle which is simple and inexpensive to manufacture and install while giving dependable service and improved riding qualities.

Other and further objects of this invention will become apparent from the following detailed description taken in conjunction with the accompanying drawings in which:

FIG. 1 is a bottom view of a swing axle assembly embodying this invention and attached to a vehicle frame, which frame is shown in phantom.

FIG. 2 is a rear elevation view of a portion of a swing axle assembly showing the means by which it is attached to the vehicle frame.

Figure 3:
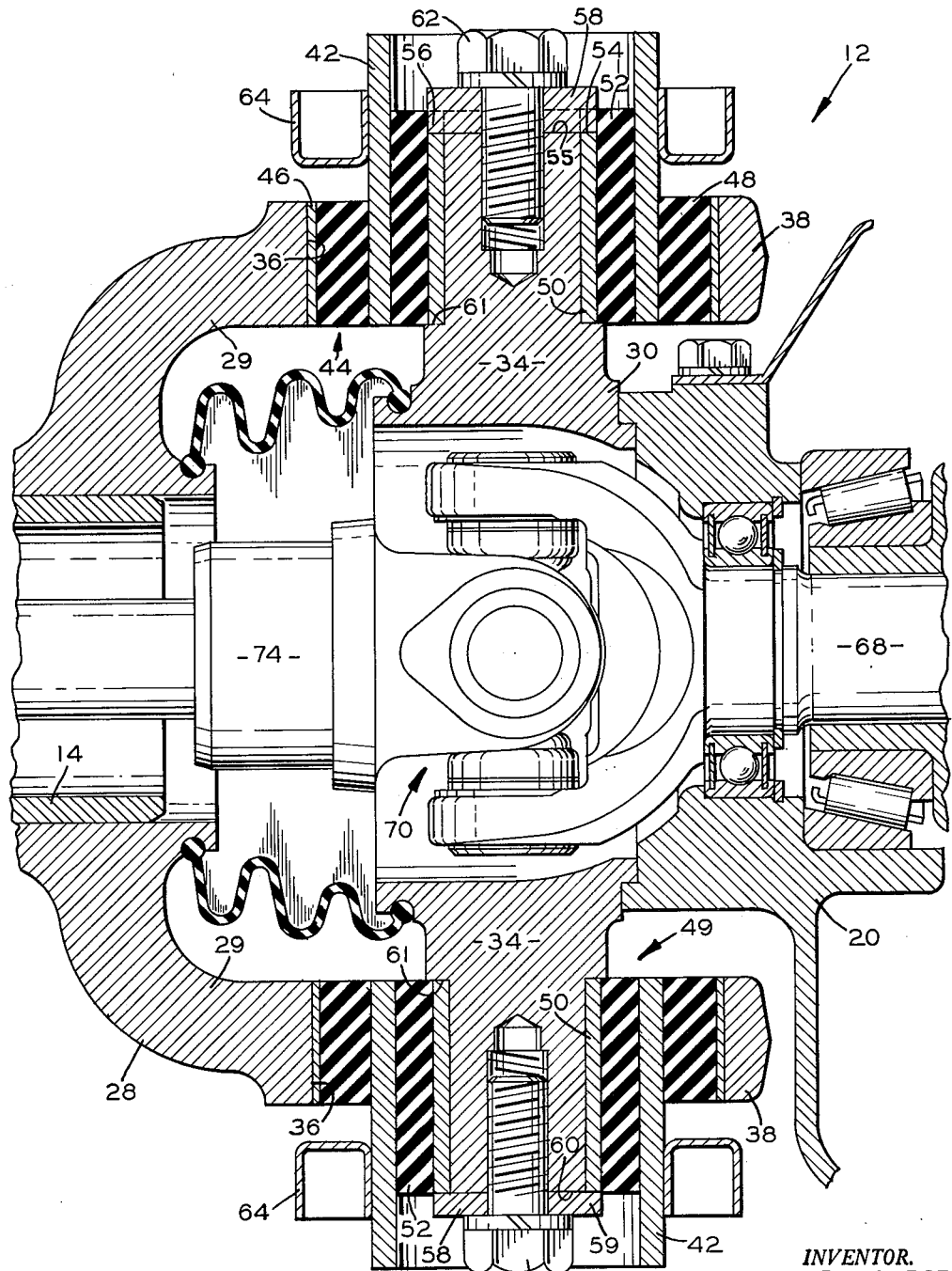
FIG. 3 is a plan view partially in section of the hinge portion of a swing axle assembly of this invention.

Referring now to the drawings and more particularly to FIG. 1, wherein the hinge joint has been incorporated in a driving or "live" axle, the axle assembly is shown generally at 10. The hinge joint shown at 12 pivotably interconnects the half axle 14 and the half axle assembly 16. The half axle assembly 16 is comprised of axle tube 18 and a conventional differential casing 20. A pair of ground wheels 21 are attached to the axle assembly 10 and driven by the differential unit (not shown) in casing 20 in the conventional manner.

A pair of aligned, spaced, substantially U shaped hanger means 22 are connected to the vehicle frame, shown fragmentarily at 24 in FIG. 2, in a suitable manner preferably by bolts 26. The hanger means 22 will be more fully described hereinafter.

Referring now to FIG. 3, wherein the hinge joint 12 is shown in greater detail, the half axle 14 has a yoke 28 fixedly secured thereto, and the differential casing 20 has a flange 30 fixedly connected thereto as by bolts 32 (shown clearly in FIG. 1). A pair of pivot means in the form of aligned cross shafts or trunnions 34 extend radially from the flange 30.

The yoke 28 is provided with a pair of aligned lugs 29 which are each provided with a semi-circular opening 36 co-axial with the trunnions 34. Each lug is also provided with a semi-circular clamp 38. Each clamp 38 cooperates with the semi-circular opening 36 and is connected to the yoke 28 by bolts 40 (as shown clearly in FIG. 1). The result is that the axle shaft 14 is provided with a pair of trunnion embracing means.

Interposed concentrically with the trunnions 34 within the openings 36 are a pair of aligned receiving means or sleeves 42. A first annular resilient means 44 is positioned between each sleeve 42 and the yoke 28 and clamp 38 within the openings 36. The resilient means 44 is comprised of an outer metallic bushing 46 which abuttingly engages the yoke 28 and an outer resilient bushing 48 which abuttingly engages the sleeves 42. The outer resilient bushing 48 is formed from a rubber-like or other resilient material giving the desired degree of resiliency and is fixedly attached to the outer metallic bushing 46 and to the receiving means or sleeve 42 as by bonding. The embracing means formed by the clamp 38 and the yoke 28 is proportioned so that when bolts 40 are tightened, the resilient means 44 is securely positioned thereby. It is now apparent that the half axle 14 is resiliently and independently connected to the receiving means or sleeves 42.

A second annular resilient means 49 is positioned between each sleeve 42 and the trunnions 34. The resilient means 49 is comprised of an inner metallic bushing 50 which abuttingly engages the trunnion 34 and an inner resilient bushing 52 which abuttingly engages the receiving means or sleeve 42. The inner resilient bushing and inner metallic bushing are fixedy secured together as by bonding. The resilient means 49 is also fixedly secured to the receiving means or sleeve 42 as by bonding. The second resilient means 49 is formed of any suitable resilient material in the same manner as the first resilient means 44 hereinbefore described.

As clearly seen in FIG. 3, with respect to the upper trunnion 34 and the bushing 50 engaging the same, each of the inner metallic bushings 50 is provided with a pair of diametrically opposed slots 54, which are in registry with a pair of diametrically opposed key means 56 provided on end washers 58. The key means 56 also engage a pair of diametrically opposed slots 55 provided on the end of each trunnion 34. As clearly seen in FIG. 3, with respect to the lower trunnion 34 and bushing 50 shown at a position 90° from the key means 56, the end washers 58 circumferentially intermediate the key means 56 are provided with a shoulder 59 which extends over the ends of the sleeves 50 and prevents the outward movement thereof. The sleeves 50 further abut shoulders 61 on the trunnions 34 which prevent the inward movement of the sleeves. The portions of washers 58 circumferentially intermediate the key means 56 and radially inwardly of the shoulder 59 are coplanar with the inner surface of the shoulder 59 and engage the end 60 of each trunnion 34 and are fixedly attached thereto as by bolts 62. In this manner the second resilient means 49 is fixedly positioned with respect to the trunnion 34 and the sleeve 42. It is now apparent that the half axle assembly 16 is resiliently and independently connected to the receiving means or sleeve 42.

As seen in FIG. 2 the brackets 22 are deformed at the bottom of the U portion so as to semi-circularly conform to the outer diameter of the sleeve 42. A clamp means 64 also formed to semi-circularly conform to the outer diameter of sleeve 42 is fixedly attached to the bracket 22 as by bolts 66 and securely connects the sleeve 42 thereto. The clamp 64 is proportioned so that when bolts 66 are tightened the sleeve 42 is securely positioned thereby. In this manner the receiving or sleeve means 42 is securedly attached to the frame 24.

Since each half axle is provided with the symmetrically balanced yoke and trunnion assembly, while the half axles may easily pivot vertically relative to each other, they are also adapted for limited horizontal and rotary movement due to the resilient mounting means 44 and 49.

To effect the drive to the ground wheels 21, one output shaft 68 from the differential 20 is provided with a conventional universal joint 70 which is accommodated for rotation and angular deflection within the space between the lugs 29 of yoke 28 and the space between the trunnions 34. Attached to and extending from the universal joint is the axle shaft 74 which drives the ground wheel 21 in a well known manner. The other ground wheel 21 is driven by another output shaft (not shown) extending from the opposite end of differential 20.

It is now apparent that a hinge joint for swinging half axles has been described wherein each member of the half axle is independently and resiliently mounted to the frame; wherein the hinge means joining the swinging axles acts as an insulating and resilient connection between the axle assembly and the vehicle frame; wherein each half of the axle assembly may swing vertically without affecting the other half axle while being resiliently limited from horizontal and rotative movement; and wherein the resilient hinge joint will resist deformation or dipping of the axle assembly due to driving and braking torque.

The preferred embodiment of this invention has been shown and described, but changes and modifications can be made, and it is understood that this description is illustrative only and not for the purpose of rendering this invention limited to the details illustrated or described except insofar as they have been limited by the terms of the following claims.

What is claimed is:

1. A swing axle assembly comprising in combination, a receiving means having a portion thereof securely attached to a vehicle, a first half axle having pivoting means thereon associated with said receiving means, a second half axle having means thereon embracing said receiving means, and a pair of resilient means with one interposed between and fixed relative to and in engagement with said pivoting means and said receiving means and the other interposed between and fixed relative to and in engagement with said embracing means and said receiving means, whereby said half axles are adapted for independent resilient movement relative to said receiving means.

2. A swing axle assembly comprising in combination, a receiving means having a portion thereof adapted for attachment to a vehicle, a first half axle having pivoting means thereon associated with said receiving means, a second half axle having means thereon embracing said receiving means, and a pair of resilient means with one interposed between and in engagement with said pivoting means and said receiving means and the other interposed between and in engagement with said embracing means and said receiving means, and a first and a second means each fixedly positioning one of said resilient means, whereby said half axles are adapted for independent resilient movement relative to said receiving means.

3. A swing axle assembly comprising in combination, a sleeve means adapted for attachment to a vehicle, a first half axle having pivoting means thereon, a second half axle having embracing means thereon, a first resilient bushing disposed in abutting engagement within said sleeve means, and a second resilient bushing disposed in abutting engagement about said sleeve means, said pivoting means being abuttingly received within said first bushing, and said embracing means being abuttingly disposed about said second bushing, whereby said half axles are adapted for independent resilient movement relative to said sleeve means.

4. A swing axle assembly comprising in combination, a hanger means adapted for attachment to a vehicle and including a sleeve means, a first half axle having a trunnion means thereon, a second half axle having a yoke means thereon, said trunnion means being received within said sleeve means and said yoke means being positioned about said sleeve means, and resilient means abuttingly interposed between said trunnion means and said sleeve means and between said yoke means and said sleeve means, whereby said half axles are adapted for independent resilient movement relative to said sleeve means.

5. In a vehicle, a swing axle assembly comprising in combination, a hanger means including a first and second sleeve means disposed in aligned spaced relationship, a first half axle having a pair of trunnions thereon, one of said trunnions being received within each of said sleeve means, a second half axle having a yoke thereon defining a pair of aligned openings in spaced relationship, one of said sleeve means disposed in each of said aligned openings, and resilient means abuttingly interposed between each of said trunnions and said sleeve means and between each of said sleeve means and said yoke, whereby said half axles are adapted for independent resilient movement relative to said vehicle.

6. In a vehicle, a swing axle assembly comprising in combination, a hanger means including a first and second sleeve means disposed in aligned spaced relationship, a first half axle having a pair of trunnions thereon, one of said trunnions being received within each of said sleeve means, a second half axle having a yoke thereon defining a pair of aligned openings in spaced relationship, one of said sleeve means disposed in each of said aligned openings, and a resilient bushing abuttingly interposed between each of said trunnions and said sleeve means and between each of said sleeve means and said yoke, and a first and a second means each fixedly positioning one of said resilient bushings, whereby said half axles are adapted for independent resilient movement relative to said vehicle.

References Cited by the Examiner

UNITED STATES PATENTS

| | | | |
|---|---|---|---|
| 1,273,412 | 7/1918 | Salsbury | 180—73 |
| 2,090,893 | 8/1937 | Ledwinka | 184—73 |
| 2,752,766 | 7/1956 | Wildhaber | 64—11 |
| 2,806,542 | 9/1957 | Scherenberg et al. | 180—73 |
| 2,841,230 | 7/1958 | Neuschaefer et al. | 180—73 |

A. HARRY LEVY, *Primary Examiner.*

GEORGE HYMAN, Jr., *Examiner.*